United States Patent [19]

Sato

[11] 4,010,480

[45] Mar. 1, 1977

[54] CONTROL CIRCUIT FOR AUTOMATICALLY CONTROLLING A DIAPHRAGM OF A CAMERA

[75] Inventor: Takayoshi Sato, Tokyo, Japan

[73] Assignee: Yugenkaisha Sato Kenkyusho, Tokyo, Japan

[22] Filed: Aug. 12, 1975

[21] Appl. No.: 604,067

[30] Foreign Application Priority Data

Aug. 19, 1974 Japan .............................. 49-94240
Aug. 19, 1974 Japan .............................. 49-94241

[52] U.S. Cl. .................................. 354/43; 354/42; 354/44; 354/60 R; 352/141
[51] Int. Cl.² .......................................... G03B 7/08
[58] Field of Search ............. 354/23 R, 40, 41, 42, 354/43, 44, 50, 60 R; 352/141

[56] References Cited

UNITED STATES PATENTS

| | | | |
|---|---|---|---|
| 3,611,894 | 10/1971 | Minneste, Jr. | 354/43 |
| 3,704,656 | 12/1972 | Ogiso et al. | 354/43 |
| 3,747,487 | 7/1973 | Tanikoshi et al. | 354/40 |
| 3,753,387 | 8/1973 | Maida | 354/43 |
| 3,772,974 | 11/1973 | Shimomura | 354/42 |
| 3,776,111 | 12/1973 | Maida | 354/44 |
| 3,818,494 | 6/1974 | Tanikoshi et al. | 354/44 |
| 3,829,870 | 8/1974 | Ogiso et al. | 354/50 |

*Primary Examiner*—Russell E. Adams, Jr.

[57] ABSTRACT

The control circuit for automatically controlling a diaphragm of a camera for the proper exposure has a servomotor coupled with the diaphragm and provided with a pair of coils each for driving a servomotor coupled with the diaphragm in the opposite direction upon energization thereof so as to open or close the diaphragm and a circuit including a photoelectric element adapted to receive scene light through the diaphragm so as to generate a first and a second input for the pair of coils varying in relation to each other in accordance with the scene light quantity passed through the diaphragm and received by the photoelectric element. The control circuit comprises two sets of circuits each consisting of a first transistor and a second transistor with their emitter grounded while the collector of the first transistor is connected to the base thereof to effect diode connection and the base of the second transistor is connected to the base of the first transistor, the collector of the second transistor in each circuit being connected through a resistor to the first and the second input, respectively, while the collector of the first transistor in each circuit is connected through a resistor to the other of the inputs than that connected to the collector of the second transistor belonging to the same circuit of the two sets, and a third transistor with its emitter grounded while its base is connected to the collector of the second transistor in each circuit so as to form emitter grounded amplifier, so that amplified output is obtained at the collector of the third transistor in each circuit proportional to the variation in the first and the second input. The collector outputs of the third transistors of the two sets are connected to the pair of coils, respectively, while they are fed back to the inputs of the two sets of circuits in negative feedback connection. Thus, the current flowing through the coils is made to the minimum when the first and the second input are balanced each other at the time the diaphragm is set at the proper exposure condition.

6 Claims, 7 Drawing Figures

CONTROL CIRCUIT FOR AUTOMATICALLY CONTROLLING A DIAPHRAGM OF A CAMERA

BACKGROUND OF THE INVENTION

The present invention relates to a servoamplifier or a control circuit for automatically controlling the diaphragm of a camera for the proper exposure.

Heretofore, differential amplifiers or complementary amplifiers have been utilized in order to automatically set the diaphragm of a camera for the proper exposure. These circuits, however, normally require bridge connection thereby limiting the range of function due to the condition of the bridge connection. In case of utilizing a differential amplifier, for example, current always flows in the two coils of the driving motor of the diaphragm even though the diaphragm is set for the proper exposure at the balanced condition of the two coils, thereby making it impossible to avoid loss of energy of the electric source. Further, the input for the control circuit of the diaphragm is affected by the variation in the voltage of the electric source.

SUMMARY OF THE INVENTION

The present invention aims at avoiding the above described disadvantages of the prior art control circuit of the diaphragm of a camera.

An object of the present invention is to provide a novel and useful control circuit for automatically controlling the diaphragm of a camera for the proper exposure in which current required for the operation of the circuit is made to the minimum at the balanced condition for the proper exposure by the diaphragm.

Another object is to provide a novel and useful control circuit of the type described above which has large latitude in variation in the voltage of the electric source while a high accuracy of operation is maintained.

The other objects and advantages will be apparent from the following description of the preferred embodiments of the present invention when read in conjunction with the accompanying drawings.

DETAILED DESCRIPTION OF THE PREFERRED EMBODIMENTS

Figure 1:
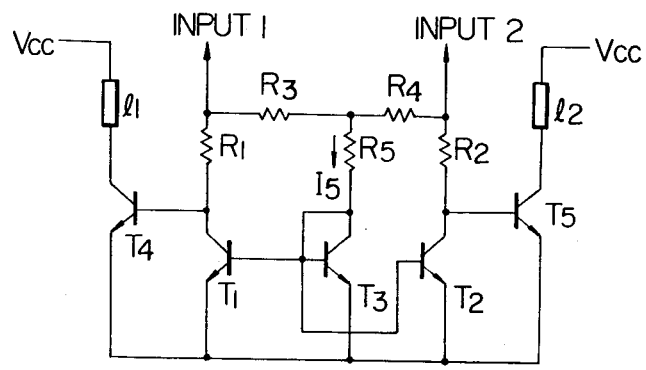
FIG. 1 is a schematic diagram showing the basic control circuit of the present invention.

Referring to FIG. 1 showing the basic circuit of the present invention, transistors $T_1$, $T_2$, $T_3$, $T_4$ and $T_5$ are of the same characteristics and the emitters of transistors $T_1$ to $T_5$ inclusive are grounded as shown. The base of transistor $T_3$ is connected to the collector thereof to effect diode connection, while the bases of transistors $T_1$ and $T_2$ are connected to the base of transistor $T_3$. The bases of transistors $T_4$ and $T_5$ are connected to the collectors of transistors $T_1$ and $T_2$, respectively, so as to form emitter grounded amplifiers, respectively. The collector of transistor $T_1$ is connected to first input 1 through resistor $R_1$ while the collector of transistor $T_2$ is connected to second input 2 through resistor $R_2$. Inputs 1 and 2 are variable in relation to each other upon variation in informations such as scene brightness on the basis of which the circuit of the present invention is actuated as described later.

The collector of transistor $T_3$ is connected to one end of resistor $R_5$, while the other end thereof is connected to input 1 through resistor $R_3$ as well as to input 2 through resistor $R_4$.

The collectors of transistor $T_4$, $T_5$ are connected to an electric source through loads $l_1$, $l_2$, respectively, so as to be supplied with voltage Vcc.

For the simplicity of the description, the resistance of resistors $R_1$ to $R_5$ is assumed to be set so as to satisfy the following relations:

$$R_1 = R_2 = \frac{R_3 \cdot R_4}{R_3 + R_4} + R_5$$

$$R_3 = R_4$$

Since the bases of transistors $T_1$, $T_2$, $T_3$ are commonly grounded, currents flowing through resistors $R_1$, $R_2$, respectively, are equal to each other if input 1 is equal to input 2. Therefore, the collector current of transistor $T_4$ is equal to that of transistor $T_5$.

Describing the relation between the current flowing through each resistor $R_1$ to $R_5$ in more detail, current $I_5$ flowing through resistor $R_5$ is:

$$I_5 = (V - V_{BE}) \bigg/ \left( \frac{R_3 \cdot R_4}{R_3 + R_4} + R_5 \right) = (V - V_{BE})/R_1$$

where:
$V$ = voltage of inputs 1 and 2
$V_{BE}$ = base-emitter voltage of the transistor
Current $I_5$ is expressed as follows:

$$I_5 = I_{C3} + I_{B3} + I_{B1} + I_{B2}$$

where:
$I_{C3}$ = collector current of transistor $T_3$
$I_{B1}$, $I_{B2}$, $I_{B3}$ + base current of transistors $T_1$ to $T_3$, respectively.
Since the bases of transistors $T_1$, $T_2$ and $T_3$ are connected to each other, the following relation is given:

$$I_{B1} = I_{B2} = I_{B3} = I_B$$

Assuming the amplification degree to be $h_{FE}$, then $$I_5 = I_B h_{FE} + 3I_B = I_{C3} + 3I_B$$

Further, since the collector currents of transistors $T_1$, $T_2$, $T_3$ are equal to each other and the currents flowing through resistors $R_1$ and $R_2$ are equal to each other, the base currents of transistors $T_4$ and $T_5$ are made $3I_B$.

Thus, the collector currents of transistors $T_4$, $T_5$ are made $3I_{C3}$, respectively.

When the voltage of input 1 increases by $+\Delta V$ while the voltage of input 2 decreases by $\Delta V$ or varies by $-\Delta V$, no change in the base currents of transistors $T_1$, $T_2$, $T_3$ will occur while the current of resistor $R_1$ increases by $\Delta V/R_1$ thereby increasing the base current of transistor $T_4$. Thus, the increment $\Delta I_{C4}$ of the collector current of transistor $T_4$ is:

$$\Delta I_{C4} = h_{FE} \cdot \Delta V/R_1.$$

In the similar way, the increment $\Delta I_{C5}$ of the collector current of transistor $T_5$ is:

$$\Delta I_{C5} = -h_{FE} \cdot \Delta V/R_1$$

Therefore, the difference between the collector outputs of transistors $T_4$, $T_5$ is proportional to the difference between the voltages of inputs 1 and 2.

Figure 2:
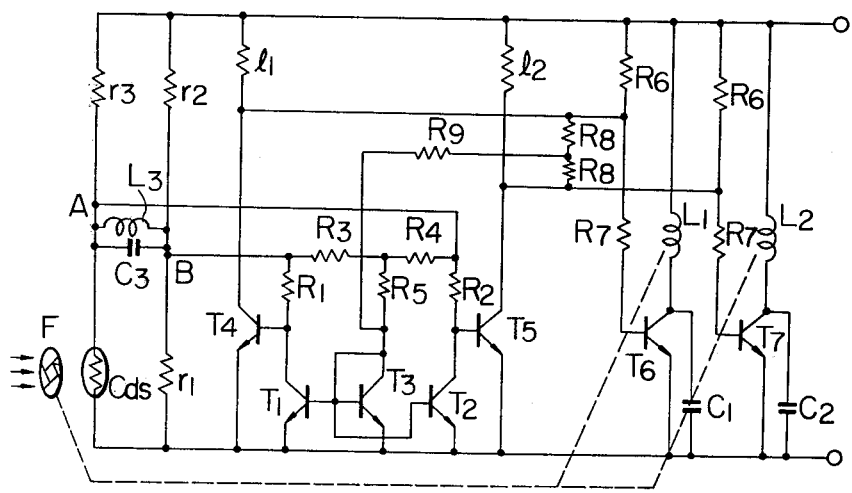
FIG. 2 is a diagram showing an embodiment of the control circuit of the present invention applied to the control of the diaphragm of a camera.

The above basic circuit is effectively utilized in accordance with the present invention in the control circuit for automatically controlling a diaphragm of a camera for the proper exposure as shown in FIG. 2.

In FIG. 2, a bridge circuit is provided which consists of photoelectric element CdS adapted to receive scene light through diaphragm F of a camera and resistors $r_1$, $r_2$ and $r_3$ each provided in each side of the bridge circuit, the bridge circuit is supplied with the source voltage from the electric source which supplies the voltage to loads $l_1$, $l_2$ as in the case of FIG. 1. Junction B of the bridge circuit is connected to the collector of transistor $T_1$ through resistor $R_1$, while junction A is connected to the collector of transistor $T_2$ through resistor $R_2$. Since the outputs at junctions A, B of the bridge circuit vary in relation to each other in accordance with the scene light quantity received by photoelectric element CdS through diaphragm F, the outputs at junctions B and A serve as inputs 1 and 2, respectively, described in connection with FIG. 1. To this end, the resistance each of resistors $r_1$, $r_2$ and $r_3$ and the characteristics of photoelectric element CdS are so selected that the output voltages at junctions A, B are made equal to each other when the aperture of diaphragm F reaches to provide the proper exposure for the camera. Coil 3 is connected between junctions A, B so as to prevent oscillation of the circuit.

The collector of transistor $T_4$ is connected through resistor $R_7$ to the base of transistor $T_6$ the emitter of which is grounded. Resistor $R_7$ is connected to the plus terminal of the electric source through resistor $R_6$. The collector of transistor $T_6$ is connected to one end of coil $L_1$, the other end of which is connected to the plus terminal of the electric source. One end of capacitor $C_1$ is connected to the collector of transistor $T_6$ the other end of which is grounded. Capacitor $C_1$ serves to prevent oscillation in the circuit.

In the similar way, the collector of transistor $T_5$ is connected through resistor $R_7$ to the base of transistor $T_7$ the emitter of which is grounded. Resistor $R_7$ is connected to the plus terminal of the electric source through resistor $R_6$. Coil $L_2$ having its one end connected to the plus terminal of the electric source is connected at the other end to the collector of transistor $T_7$. Capacitor $C_2$ serving to prevent oscillation of the circuit is connected between the collector of transistor $T_7$ and the ground or the minus terminal of the electric source.

Coils 1, 2 are incorporated in a servomotor (not shown) which is coupled with diaphragm CdS so that, when coil 1 is energized, the servomotor is driven to close diaphragm F, while, when coil 2 is energized, the servomotor is driven to open diaphragm F.

In accordance with a feature of the present invention, the collector of transistor $T_4$ and the collector of transistor $T_5$ are connected to each other through two resistors $R_8$, $R_8$ connected in series to each other and the junction of resistors $R_8$, $R_8$ is connected to the collector of transistor $T_3$ through resistor $R_9$ so as to form negative feedback connection. Desired number of transistors may be provided in the negative feedback connection.

In operation, when the scene light quantity received by photoelectric element CdS through diaphragm F is under overexposure condition, transistor $T_4$ provides greater output than transistor $T_5$ so that transistor $T_6$ is actuated to energize coil $L_1$ so as to close diaphragm F thereby reducing light quantity received by photoelectric element CdS. Thus, the output from transistor $T_4$ is reduced while the output from transistor $T_5$ is increased. When the outputs of both resistors $T_4$, $T_5$ are balanced, diaphragm F is stopped and held at the proper exposure condition. The above operation applies in the case where the scene light quantity is under underexposure condition.

Figure 3:
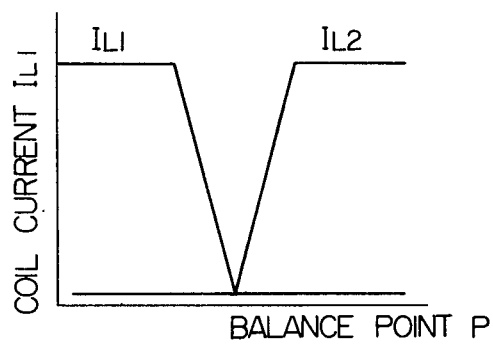
FIG. 3 is a diagram showing the relation between the coil current of the driving motor for the diaphragm of the present invention and the balance point of the diaphragm at the proper exposure condition.

In this case, the negative feedback from the outputs of transistors $T_4$, $T_5$ to transistor $T_3$ is so set that currents $I_{L1}$, $I_{L2}$ flowing through coils $L_1$, $L_2$ are reduced substantially to zero when the bridge circuit is balanced as shown in FIG. 3. Thus, currents $I_{L1}$, $I_{L2}$ flowing through coils 1, 2 at balance point P of the bridge circuit can be reduced to the minimum in accordance with the present invention.

Figure 4:
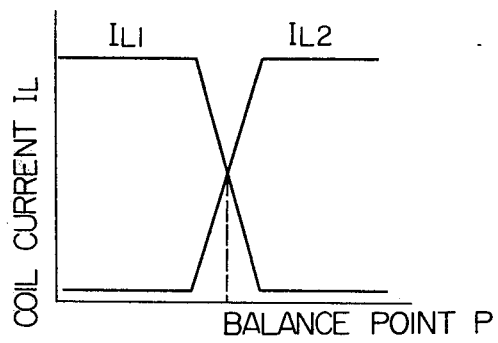
FIG. 4 is a diagram similar to FIG. 3 but showing the prior art.

To the contrary, since the sum of currents $I_{L1}$, $I_{L2}$ flowing through coils 1, 2 in the prior art control circuit are always kept the same as shown in FIG. 4 even at the balance point, thereby suffering from greater consumption of electric power.

Further, in accordance with the present invention, variation in source voltage will not affect the performance of the control circuit as described previously.

The present invention is suitable for forming integrated circuits by virtue of the transistors used therein being of the same characteristics.

Figure 5:
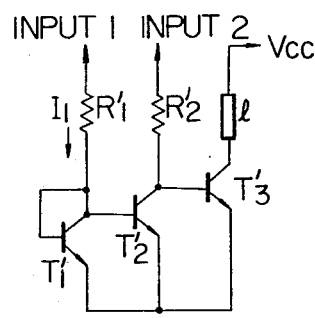
FIG. 5 is a diagram showing an alternative form of the basic circuit of the present invention.
Figure 6:
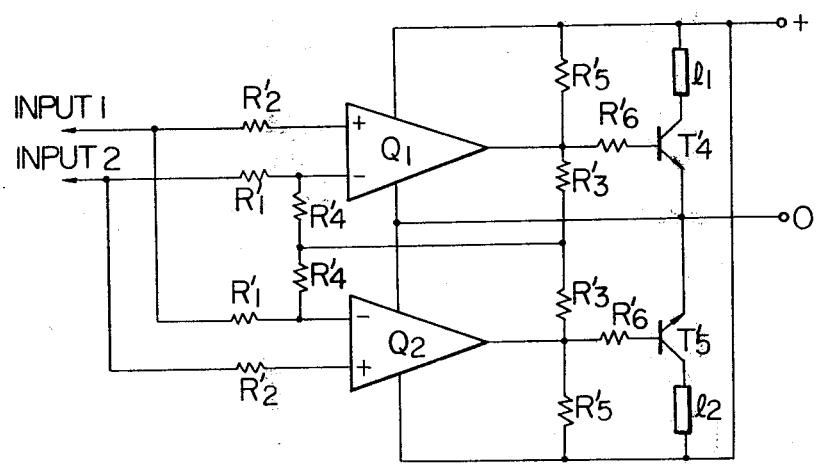
FIG. 6 is a diagram showing a circuit incorporating therein two sets of circuits of FIG. 5 so as to avoid the influence of the variation in the input level thereto.
Figure 7:
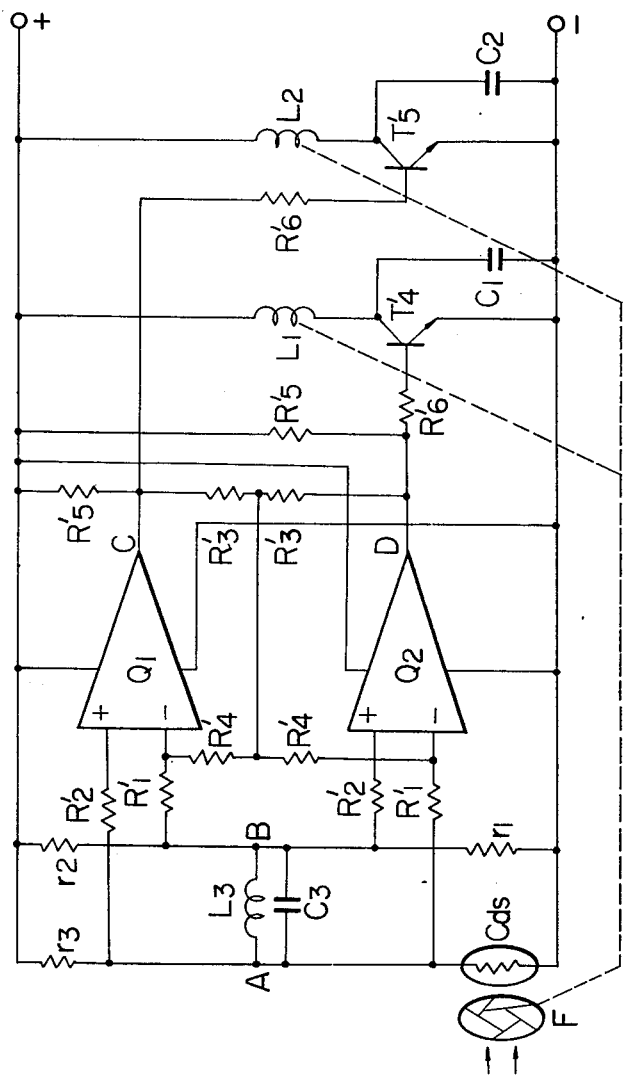
FIG. 7 is a diagram showing another embodiment of the control circuit of the present invention in which the circuit of FIG. 6 is applied to the control of the diaphragm of a camera.

FIGS. 5 to 7 show an alternative form of the circuit of the present invention in which two sets of integrated circuits are used.

In FIG. 5 showing the basic circuit provided in the integrated circuit, the emitters of transistors $T_1'$, $T_2'$ and $T_3'$ of the same characteristics are grounded while the collector of transistor $T_1'$ is connected to the base thereof to effect diode connection and the base of transistor $T_2'$ is connected to the base of transistor $T_1'$, the base of transistor $T_3'$ being connected to the collector of transistor $T_2'$ so as to form emitter grounded amplifier. The collector of transistor $T_1'$ is connected to input 1 through resistor $R_1'$ and the collector of transistor $T_2'$ is connected to input 2 through resistor $R_2'$ while the collector of transistor $T_3'$ is connected to source voltage $Vcc$ through load $l$, so that the collector of transistor $T_3'$ serves as the output of the integrated circuit.

In operation, since base current $I'_{B1}$ of transistor $T_1'$ is equal to base current $I'_{B2}$ of transistor $T_2'$, collector current $I_{C1}$ of transistor $T_1'$ is equal to collector current $I'_{C2}$ of transistor $I'_{C2}$ and current $I_1'$ flowing through resistor $R_1'$ is:

$$I_1' = I'_{c1} + 2I'_B$$

where:

$$I'_{B1} = I'_{B2} = I'_B$$

For the sake of simplicity, it is assumed that $R_1' = R_2'$. Then, if input 1 is equal to input 2, base current I'B3 of transistor $T_3'$ is:

$$I'_{c3} = 2I'_{c1} = 2I'_{c2}$$

Assuming that the input voltages of inputs 1 and 2 are V when they are the same each other and the input voltages of inputs 1 and 2 vary by $\Delta V$ and by $-\Delta V$, respectively, then the output of transistor $T_3$ varies in proportion to variation $\Delta V$.

Further, if the levels of the input voltages of inputs 1 and 2 vary as a whole, the output of transistor $T_3'$ is also varied.

However, if two sets of the circuits shown in FIg. 1 are used in combination as shown in FIG. 6, then the variation as a whole in the levels of the input voltages of inputs 1 and 2 is compensated for.

In FIG. 6, $Q_1$ and $Q_2$ represent the integrated circuits (IC) in which the circuits shown in FIG. 5 are incorporated, respectively.

Sign (+) or (−) represents the same phase of output in FIG. 6

Inputs 1 and 2 are connected to IC $Q_1$ and IC $Q_2$ through resistors $R_1'$, $R_2'$ as shown and the outputs of IC $Q_1$ and IC $Q_2$ are connected to the bases of transistors $T_4'$, $T_5'$ through resistors $R_6'$, respectively. The emitters of transistors $T_4'$, $T_5'$ are grounded while the collectors thereof are connected to the source voltage through loads $l_1$ and $l_2$, respectively.

In the similar manner as in the case of FIG. 2, the outputs of IC $Q_1$ and IC $Q_2$ are connected to each other through two resistors $R_3'$, $R_3'$ which are connected in series to each other. The junction of resistors $R_3'$ is connected to the minus input each of IC $Q_1$ and IC $Q_2$ through resistor $R_4'$, respectively so as to effect negative feedback.

With this arrangement, no change is given to the feedback by the difference between the inputs 1 and 2. However, when the levels of inputs 1 and 2 vary as a whole, the feedback is affected thereby so as to render the sum of the output voltages of IC $Q_1$ and IC $Q_2$ to be constant.

Thus, the outputs of transistors $T_4'$, $T_5'$ are made constant currents when there is no difference between inputs 1 and 2, whereas difference between outputs of transistors $T_4'$, $T_5'$ will occur only when difference exists between inputs 1 and 2.

In case of a differential amplifier, the input is limited by source voltage Vcc, because a voltage is required for actuating the next stage of the amplifier which is to be subtracted from source voltage Vcc. To the contrary, the circuit of the present invention provides no limit to the input at the higher side. With respect to the lower limit of the input, the limit is extended to base-emitter voltage $V_{BE}$ of the transistor in the present invention, whereas, in the case of a differential amplifier, the limit extends only to the sum of the bias voltage of the emitter and base-emitter voltage $V_{BE}$ of the transistor. A constant output can be obtained in FIG. 5 by applying constant current to transistor $T_3'$ and setting the two resistors to a predetermined ratio, the output being determined by amplification degree $h_{FE}$ of the transistor.

FIG. 7 shows the automatic control circuit for a diaphragm of a camera for the proper exposure in which the circuit of FIG. 6 is utilized.

The general arrangement of FIG. 7 is substantially similar to that of FIG. 2 except that IC $Q_1$ and IC $Q_2$ are used in place of the circuit of FIG. 1 incorporated in the circuit of FIG. 2.

In FIG. 7, the output at junction A of the bridge circuit including photoelectric element CdS is applied to the plus input of IC $Q_1$ through resistor $R_2'$ and to the minus input of IC $Q_2$ through resistor $R_1'$, while the output at junction B is applied to the minus input of IC $Q_1$ through resistor $R_1'$ and to the plus input of IC $Q_2$ through resistor $R_2'$. The output of IC $Q_1$ is connected to coil $L_2$ through resistor $R_6'$ and transistor $T_5'$ while the output of IC $Q_2$ is connected to coil $L_1$ through resistor $R_6'$ and transistor $T_4'$. Negative feedback is provided to IC $Q_1$ and IC $Q_2$ through resistors $R_3'$ and $R_4'$ as shown.

In operation, in like manner as in the case of FIG. 2, output is given in either one of IC $Q_1$ and IC $Q_2$ depending upon whether the scene light quantity received by photoelectric element CdS is under over- or under-exposure condition, thereby actuating either of transistors $T_4'$ and $T_5'$ so that either of coils $L_1$ and $L_2$ is energized to adjust diaphragm F unitl inputs to IC $Q_1$, IC $Q_2$ are balanced at the proper exposure condition of diaphragm F.

Since negative feedback connection is given in the circuit of FIG. 7, the current flowing through coils $L_1$, $L_2$ is reduced to the minimum at balance point P of the bridge circuit as in the case of FIG. 2.

I claim:

1. Control circuit for automatically controlling a diaphragm of a camera for proper exposure comprising a pair of coils for actuating diaphragm adjusting means coupled with said diaphragm, one of said coils, when energized, actuating said adjusting means in one direction for opening said diaphragm while the coil, when energized, actuates said adjusting means in the opposite direction for closing said diaphragm, and a circuit having photoelectric element for generating a first input and a second input for the respective one of said coils varying oppositely to each other depending upon the scene light quantity received by said photoelectric element through said diaphragm so that said diaphragm is driven and held at the proper exposure condition at the balance point of said first and said second input under the condition of said scene light quantity received by said photoelectric element through said diaphragm, a first transistor with its emitter grounded while its collector is connected to the base thereof to effect diode connection, a first pair of transistors of the same characteristics as said first transistor with their emitters grounded while the bases thereof are connected to the base of said first transistor, a second pair of transistors of the same characteristics as said first transistor with their emitters grounded while the bases thereof are connected to the collectors of the respective transistors of said first pair to form emitter grounded amplifiers, each of the collectors of the transistors of said first pair being connected to said first input and said second input through a resistor, respectively, while the collector of said first transistor is connected through a resistor to the midpoint of a resistor connected between said first input and said second input, each of the collectors of the transistors of said second pair being connected to the respective one of said pair of coils, a first resistor connected between said collectors of the transistors of said second pair, the midpoint of said first resistor being connected through a second resistor to the midpoint of said resistor connected between said first and second input so as to effect negative feedback, the current flowing through said pair of coils being thereby reduced to the minimum at the balance point of said first and said second input at which said diaphragm is held at the proper exposure condition.

2. Control circuit according to claim 1, wherein said circuit having said photoelectric element comprises a bridge circuit consisting of said photoelectric element and three resistors each provided in each side of said bridge circuit so as to generate said first and said second input at the opposite junctions thereof.

3. Control circuit according to claim 1, wherein each of the collectors of the transistors of said second pair is connected to the respective one of said pair of coils through a transistor.

4. Control circuit for automatically controlling a diaphragm of a camera for the proper exposure including a pair of coils for actuating diaphragm adjusting means coupled with said diaphragm, one of said coils, when enegized, actuating said adjusting means in one direction for opening said diaphragm while the other coil, when energized, actuates said adjusting means in the opposite direction for closing said diaphragm, and a circuit having a photoelectric element for generating a first input and a second input for the respective one of said coils varying oppositely to each other depending upon the scene light quantity received by said photoelectric element through said diaphragm so that said diaphragm is driven and held at the proper exposure condition at the balance point of said first and said second input under the condition of said scene light quantity received by said photoelectric element through said diaphragm, a first and a second circuit each consisting of a first transistor with its emitter grounded while its collector is connected to the base thereof to effect diode connection, a second transistor of the same characteristics as said first transistor with its emitter grounded while its base is connected to the base of said first transistor and a third transistor of the same characteristics as said first transistor with its emitter grounded while its base is connected to the collector of said second transistor to form an emitter grounded amplifier, each of the collectors of said first and second transistor of said first circuit being connected through a resistor to said first input and said second input, respectively, each of the collectors of said first and said second transistor of said second circuit being connected through a resistor to said second input and said first input, respectively, thereby generating a first output at the collector of said third transistor of said first circuit while a second output is generated at the collector of said third transistor of second circuit, each of said pair of coils being connected to the collector of said third transistor of said first and second circuit, respectively, the midpoint of a resistor connected between the collectors of said third transistors of said first and said second circuit being connected to the midpoint of a resistor connected between said first input and said second input to effect negative feedback, the current flowing through said pair of coils being thereby reduced to the minimum at the balance point of said first and said second input at which said diaphragm is held at the proper exposure condition.

5. Control circuit according to claim 4, wherein said circuit having said photoelectric element comprises a bridge circuit consisting of said photoelectric element and three resistors each provided in each side of said bridge circuit so as to generate said first and said second input at the opposite junctions thereof.

6. Control circuit according to claim 4, wherein each of the collectors of said third transistors of said first and said second circuit is connected through a transistor to the respective one of said pair of coils.

* * * * *